March 26, 1968 J. VAN BENTHUYSEN ET AL 3,375,478
ELECTRICAL CONTROL AND METHOD OF MAKING THE SAME
Filed May 11, 1964 2 Sheets-Sheet 2
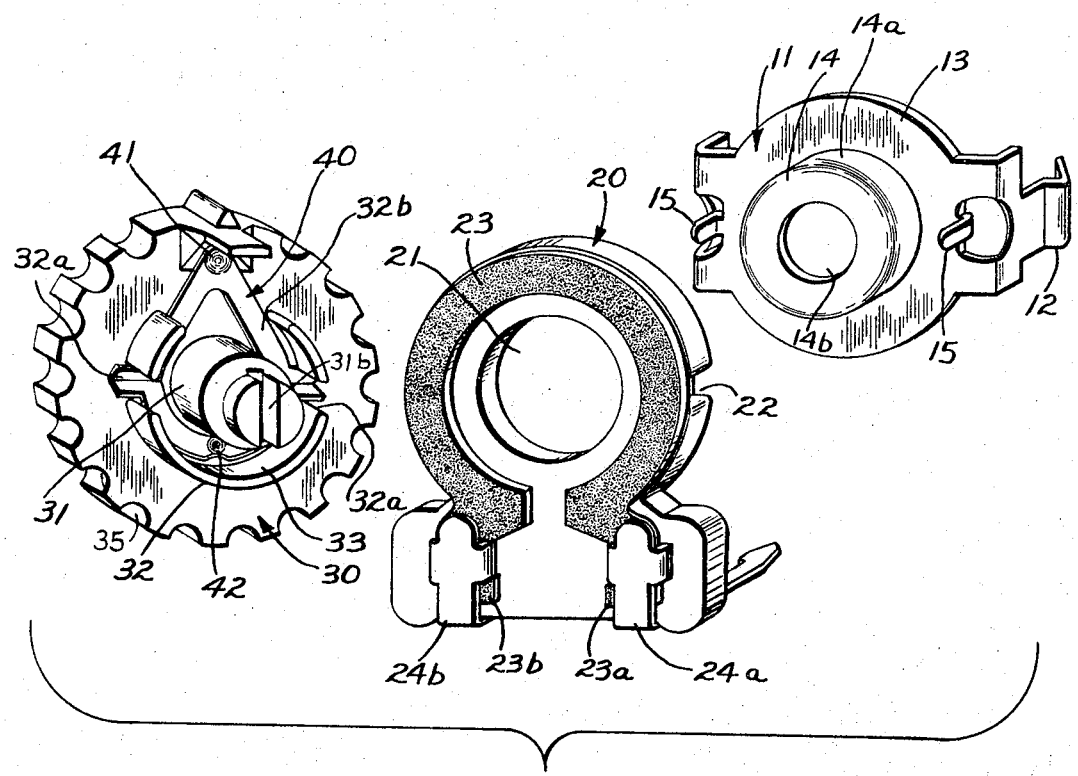
FIGURE 4.
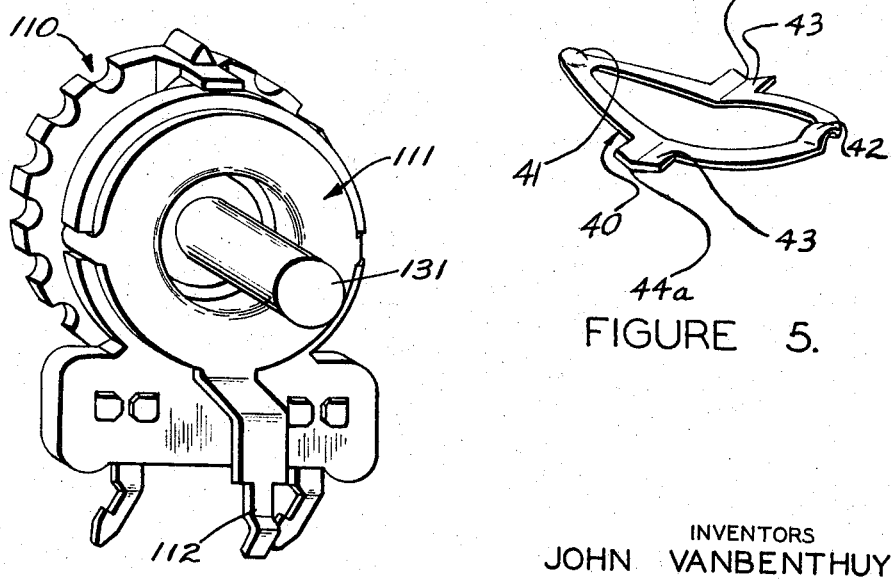
FIGURE 5.
FIGURE 6.
INVENTORS
JOHN VANBENTHUYSEN
WAYNE A BARDEN
BY John J. Gaydos
ATTORNEY

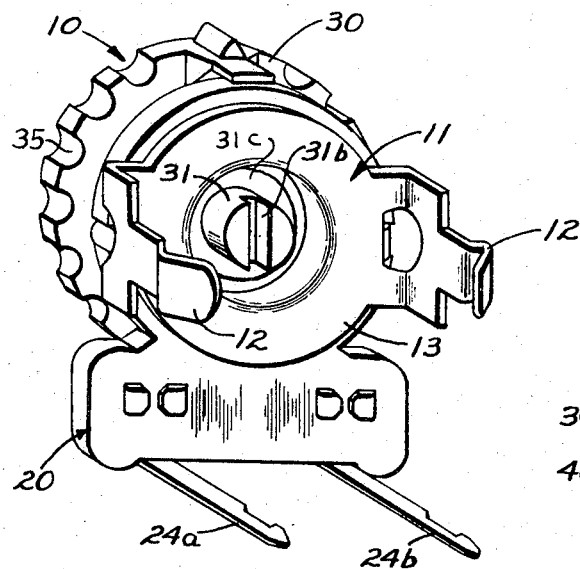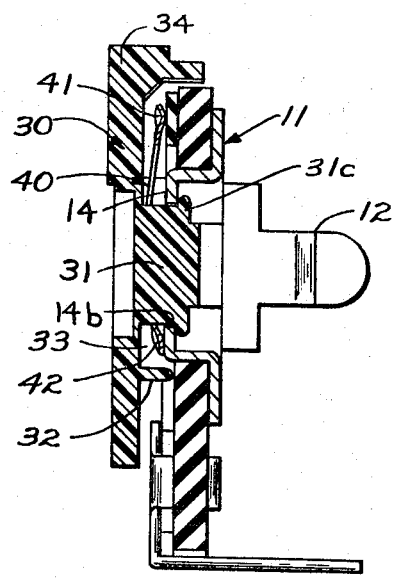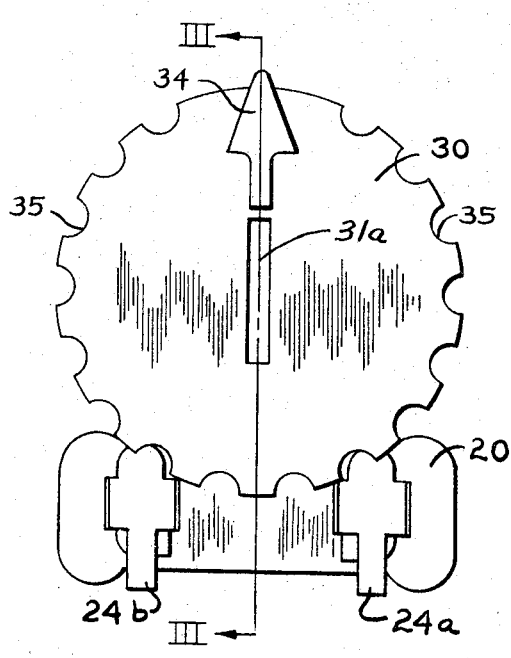

United States Patent Office 3,375,478
Patented Mar. 26, 1968

3,375,478
ELECTRICAL CONTROL AND METHOD OF
MAKING THE SAME
John Van Benthuysen and Wayne A. Barden, Elkhart,
Ind., assignors to CTS Corporation, Elkhart, Ind., a
corporation of Indiana
Filed May 11, 1964, Ser. No. 366,542
10 Claims. (Cl. 338—174)

ABSTRACT OF THE DISCLOSURE

A variable resistance control having a resistance element supported on an electrically conductive bracket integral with a collector ring. A rotatable member is rotatably secured to the bracket with an electrically nonconductive heat-deformable shaft. The portion of the shaft journaled in an aperture provided in the bracket is swaged to increase the diameter and improve the bearing fit between the shaft and the bracket. An annular ring integral with the rotatable member slideably engages the resistance element for stabilizing the rotatable member relative to the resistance element and an equalizing contactor pivotally supported by a pair of arms is nestedly disposed in the space between the shaft and the annular ring.

---

The present invention relates to electrical controls, and, more particularly, to a variable resistance control of the type provided with a rotatable contactor and to a method of making the same.

Many of the variable resistance controls presently manufactured must meet many design and test requirements, for example, the shaft must be rotatable in a substantially wobbleless manner, and the fluid or lubricant in the bearing must not impose a substantial load upon the shaft at at subnormal temperatures or flow out of the bearing at elevated temperatures. It is well known that several materials such as nylon are excellent bearing-forming materials since these materials need not be lubricated with a fluid. Consequently many shafts whether of brass, steel or the like are journaled in nylon bearings. Such construction, however, requires that the shafts usually be machined in order that the proper bearing fit be maintained. In recent years, the cost of some variable resistance controls has been decreased by making the shafts of an electrically nonconductive material such as nylon. An example of a nylon shaft construction is shown in the Zunker et al. Patent No. 3,032,734, dated May 1, 1962. Although the variable resistance controls with nylon shafts are primarily employed in equipment not requiring controls having close bearing fits, these controls would be further accepted and in greater demand if the bearing fit could be improved without substantially increasing the cost of the control. It would, therefore, be desirable to provide a variable resistance control having a nylon shaft closely fitted in a bearing.

Whenever the shaft rotatably supporting the contactor is loosely fitted in the bearing of the variable resistance control, many problems, e.g., wobbleness, occur. These problems become of greater concern as the size and the cost of the control are decreased. It would, therefore, be desirable to provide a method for properly fitting the shaft in the bearing during assembly and for preventing wobbleness of the rotatable member of the variable resistance control.

One of the most difficult requirements to obtain with a decrease in size of a variable resistance control is to maintain the proper rotational torque. Thrust washers and the like generally become ineffective because the washers are provided with standard manufacturing tolerances. Heretofore, whenever a nylon shaft has been used in the manufacture of a variable resistance control, the method of obtaining the proper rotational torque has been accomplished in the same manner as with metal shafts. It would, therefore, be desirable to provide improved means for maintaining the proper rotational torque by prestressing the nylon shaft during the process of assembling the variable resistance control.

The conventional variable resistance control generally employs a rotatable contactor fixedly secured to the rotatable member, i.e., the driver. As the size of the control decreases, greater problems also are encountered in constraining the contactor to rotate with the driver. Moreover, the deviation in contact pressure of the contactor varies inversely with the size of the contactor since the contactor as well as the other parts of the control are made with standard manufacturing tolerances to maintain cost at a minimum. Thus there is a tendency for a greater differential in contact pressures to exist against the resistance element and the collector ring. It would, therefore, also be desirable to provide a variable resistance control with improved means for constraining the contactor to rotate with the driver as well as employ a contactor having means for equalizing the contact pressures in a preset ratio against the resistance element and the collector ring.

Accordingly, it is an object of the present invention to provide a new and improved variable resistance control having the various desirable features set forth above.

Another object of the present invention is to provide a variable resistance control with a shaft of an electrically nonconductive heat-deformable material, the end thereof being swaged to secure the shaft to the mounting bracket and to increase the diameter of the shaft in the bearing supporting the shaft.

An additional object of the present invention is to provide a variable resistance control of simple and compact structure with a rotatable member having an integral shaft rotatable in a bearing and an additional annular bearing equally spaced from the shaft and disposed within an arcuate resistance element for eliminating the wobbleness of the rotatable member as it is rotated.

A further object of the present invention is to provide a variable resistance control wherein the inner periphery of the collector ring functions as a bearing for rotatably supporting a shaft and the outer periphery of the collector ring aligns the base of the control supporting the arcuate resistance element in concentric relationship with the shaft.

Still another object of the present invention is to provide a variable resistance control with an arcuate cavity in the inner surface of the rotatable member for nestedly supporting a contactor and for constraining the contactor to rotate with the rotatable member.

Yet another object of the present invention is to provide a variable resistance control with a collector ring integrally connected to and embossed from a mounting bracket.

A still further object of the present invention is to provide a variable resistance control of simple and compact structure embodying a contactor provided with a pair of diametrically opposed pivotal arms for equalizing the contact pressures in a preset ratio applied by the contacts of the contactor against the arcuate resistance element and the collector ring.

Still an additional object of the present invention is to provide a method of providing the proper rotational torque and a method of improving the fit between a bearing and the shaft rotatable therein when assembling the variable resistance control.

Further objects and advantages of the present invention will become apparent as the following description proceeds, and the features of novelty characterizing the invention will be pointed out with particularity in the claims annexed to and forming a part of this specification.

Briefly, the present invention is concerned with a variable resistance control comprising an electrically nonconductive heat-deformable shaft, e.g., of nylon, supported by a mounting bracket provided with an embossed annular member or collector ring having an apertured center portion. A base having an arcuate resistance element fixedly secured thereto with a pair of terminals securing the ends of the arcuate resistance element to the base is also provided with a centrally disposed opening, the inner edge thereof cooperating with the outer periphery of the collector ring for aligning the collector ring in concentric relationship with the arcuate resistance element. Suitable tabs are provided between the base and the mounting bracket for preventing rotation therebetween. A rotatable member of electrically nonconductive heat-deformable material, such as nylon, is integrally secured to the shaft, and an annular ring spaced from the shaft provides an arcuate cavity nestedly supporting a contactor. The contactor received in the arcuate cavity is provided with a pair of diametrically opposed pivotal arms, and on opposite sides of the pair of pivotal arms is a pair of contacts, one of the contacts engaging the collector ring and the other contact engaging the arcuate resistance element. Thus, an increase in force upon one of the contacts of the contactor automatically increases the force upon the other contactor in a preset ratio thereby equalizing the forces applied thereagainst.

For a better understanding of the present invention, reference may be had to the accompanying drawings wherein the same reference numerals have been applied to like parts and wherein:

FIGURE 1 is an isometric rear view of an improved variable resistance control built in accord with the present invention;

FIGURE 2 is a front view of the variable resistance control shown in FIGURE 1;

FIGURE 3 is a cross sectional view of the variable resistance control taken along lines III—III of FIGURE 2;

FIGURE 4 is an exploded view of the variable resistance control shown in FIGURE 1;

FIGURE 5 is an isometric view of the equalizing contactor for the variable resistance control of the present invention; and FIGURE 6 is another embodiment of a variable resistance control of the present invention.

Referring now ot the drawings, there is illustrated a variable resistance control, generally indicated at 10, comprising a mounting bracket 11, a base 20, an electrically nonconducting heat-deformable rotatable member 30, and an equalizing contactor 40.

Considering first the mounting bracket 11, as best seen in FIGURES 1 and 4 of the drawings, it preferably comprises a one piece sheet metal stamping having a pair of snap-in fingers 12 extending rearwardly from a flat center portion 13 for quickly mounting and electrically connecting a portion of the variable resistance control 10 to a panel or the like. A collector ring 14 is embossed from the flat center portion 13 and extends inwardly thereof, the outer periphery 14a of the collector ring being positioned in an opening 21 of the base 20 for aligning the base 20 in concentric relationship with the collector ring 14. The collector ring 14 preferably projects into the opening 21 slightly greater than the thickness of the base 20 (see FIGURE 3). It is to be understood, however, that the depth of projection is not critical so long as the collector ring 14 is centered in the opening 21 by the outer periphery 14a.

For the purpose of preventing relative rotation between the base 20 and the mounting bracket 11, a pair of inwardly extending tabs 15 are disposed on opposite sides of the flat center portion 13 and engage notches 22 in the base. The tabs 15 are integral with the mounting bracket and preferably are punched out of the flat center portion 13 thereof.

As best illustrated in FIGURE 4 of the drawings, an arcuate resistance element 23 provided with a pair of depending legs 23a and 23b is fixedly mounted to the base 20 with a pair of terminals 24a and 24b in a suitable manner well known in the art. When the resistance element is of a carbon composition, the base generally is punched from an electrically nonconductive material such as laminated plastic; however, a base or substrate of ceramic material may be employed whenever higher temperature resistance elements are preferred and the rotatable member 30 may be journaled in an aperture in the substrate. The ends of the terminals 24a and 24b may extend rearwardly of the base as shown in FIGURES 1, 3 and 4 of the drawings, the disposition thereof depending upon the location of the mounting panel.

In a device built in accord with the present invention, the rotatable member 30 preferably is molded of an electrically nonconductive heat-deformable material such as nylon. For rotatably supporting the member 30 with respect to the base 20, a shaft or spindle 31 extends inwardly of the rotatable member 30 and is journaled in the aperture 14b provided in the collector ring 14. With the above-described arrangement, the rotatable member 30 is readily assembled to the mounting bracket 11 by merely inserting the end of the shaft 31 into the aperture 14b of the collector ring 14 and heat swaging the end of the shaft projecting outwardly from the collector ring 14 as shown in FIGURES 1 and 3 of the drawings. Thus the collector ring 14 not only rotatably supports the shaft 31 extending inwardly from the rotatable member 30 but also centers the base 20 and the resistance element 23 with respect to the rotatable member 30. A suitable heated cylindrical tool having an apertured bore is employed for swaging the outer periphery of the shaft against the rear surface of the collector ring to form an enlarged portion 31c, and simultaneously the swaging operation increases the diameter of the shaft disposed in the aperture 14b of the collector ring 14. Such design assures a tight bearing fit between the shaft 31 and the bearing or aperture 14b as well as eliminating longitudinal movement of the shaft. Whenever the control 10 is adjusted frequently, the inner edge of the collector ring defining the aperture 14b, is widened to increase the surface area of the bearing.

It will be appreciated that as the size of the control is decreased greater problems are encountered in securing the contactor to the rotatable member 30 and in constraining the contactor 40 to rotate with the rotatable member 30. The arrangement for accomplishing this will be described in detail hereinafter. As best shown in FIGURE 4 of the drawings, extending rearwardly from the inner surface of the rotatable member 30 is an arcuate member or annular ring 32 integral with the member 30, the outer edge or peripheral lip of the annular ring 32 engaging the portion of the base 20 (see FIGURE 3) adjacent to and circumposing the outer periphery of the collector ring 14. The variable resistance control 10 is thereby provided with two bearing surfaces, the first bearing surface being the surface of the aperture 14b supporting the shaft 31 and the second bearing surface being the outer edge of the annular ring 32. The first bearing surface aligns the contactor 40 with the resistance element 23 and the collector ring 14 when the rotatable member 30 is rotated with respect to the base 20, and the second bearing surface stabilizes the rotatable member 30 and thus prevents wobbleness when the rotatable member is rotated.

Preferably and as illustrated in FIGURE 4 of the drawings, the contactor 40 having a pair of contacts 41 and 42 is nestedly received in an annular cavity 33 formed by the shaft 31 and the inner surface of the annular ring 32. The contact 41 is disposed a greater distance from the axis of the shaft 31 than the contact 42 of the contactor 40 for making electrical engagement with the arcuate resistance element 23 and the contact 42 engages the collector ring 14. The distance from the contacts 41 and 42 to the axis of the shaft also determines the ratio of the contact pressures. To constrain the contactor 40 to rotate with the rotatable member 30, the annular ring 32 is provided with a pair of slots 32a receiving a pair of outwardly extending diametrically opposite arms 43 integrally connected to the contactor 40. The annular ring 32 is also provided with a slot 32b for receiving the portion of the contactor 40 carrying the contact 41. The arms 43 of the contactor 40 are preformed into a V cross-section by forming a crease extending through both arms as shown in FIGURE 5 of the drawings, and the bottom edge of the V forms pivot edges 44a and 44b for pivotal movement of the contactor. Therefore, any manufacturing tolerances resulting in the angle that the contactor is creased or should any differences in tolerances or thickness occur so as to vary the dimension between the top surface of the collector ring and the arcuate resistance element, the contact pressures thereagainst will be balanced in a preset ratio since the contactor 40 will merely pivot on pivot edges 44a and 44b.

From the above description it is apparent that the variable resistance control 10 can be rapidly assembled in production. For example, the rotatable member 30 is carried by a movable supporting surface and a contactor 40 is automatically assembled to the rotatable member 30 by merely dropping the contactor 40 over the shaft 31 with the arms 43 of the contactor in alignment with the slots 32a. The mounting bracket 11 is then assembled to the base 20 with the arcuate resistance element 23 facing the rotatable member 30. After the base 20 and mounting bracket 11 are assembled in position on the shaft 31, it is merely necessary to compress the parts together and heat swage the outer peripheral portion of the shaft to secure the mounting bracket to the rotatable member 30. By heat swaging only the outer periphery of the shaft as shown in FIGURES 1 and 3, the rotatable member may still be rotated by inserting a tool in the slot 31b provided in the distal end of the shaft. Simultaneously, during the heat swaging operation, the force of the heat swaging tool increases the diameter of the shaft within the aperture 14b for improving the fit between the shaft and the bearing. Whenever it is desired to increase the rotational torque of the variable resistance control 10, it is merely necessary to provide a button or raised portion in the center of the surface supporting the rotatable member 30 for urging the shaft 31 further into the aperture 14b of the collector ring 14. Since the button engages only the center portion of the rotatable member 30, the peripheral edge of the rotatable member 30 is forced downwardly due to the pivotal action of the annular ring 32 and forms the rotatable member 30 into a dished or concave construction encircling the button, such construction developing a prestressed condition in the shaft after final assembly. By controlling the thickness of the button, the rotational torque may be readily controlled. After the enlarged portion 31c of the shaft 31 cools sufficiently, the force compressing the parts together is released.

In order that the variable resistance control 10 can be rotated from either the front or rear thereof, a slot 31a (see FIGURE 2) is provided on the front surface thereof in addition to the slot 31b provided in the rear end of the shaft (see FIGURES 1 and 4). An arrow 34 is provided on the front face of the rotatable member 30 to indicate the angular position of the contactor, i.e., to indicate the amount of resistance in or out of the circuit. A plurality of undulations 35 is provided in the periphery of the rotatable member to facilitate rotation thereof without a tool.

An additional embodiment of the invention is shown in FIGURE 6 of the drawings, the variable resistance control 110 being substantially the same as the variable resistance control 10 shown in FIGURES 1–4 of the drawings. The main difference is that the shaft 131 extends rearwardly sufficiently so as to provide means for securing a knob or the like to the shaft of the control. Further, the mounting bracket 111 is provided with a depending terminal 112 instead of a pair of rearwardly extending terminals for mounting the variable resistor to a horizontally disposed mounting plate instead of a vertically disposed mounting plate.

While there has been illustrated and described what is at present considered to be a preferred embodiment of the present invention, a single modification thereof, and a method of making the same, it will be appreciated that numerous changes and modifications are likely to occur to those skilled in the art, and it is intended in the appended claims to cover all those changes and modifications which fall within the true spirit and scope of the present invention.

What is claimed as new and desired to be secured by Letters Patent of the United States is:

1. A variable resistance control comprising an electrically conductive mounting bracket, a collector ring embossed from the plane of the mounting bracket and provided with an aperture, an electrically nonconductive heat-deformable shaft rotatably journaled in the aperture, an electrically nonconductive rotatable member integrally secured to the shaft in spaced relationship to the mounting bracket, an electrically nonconductive base carried by the mounting bracket and disposed between the mounting bracket and the rotatable member, an arcuate member extending partially around the shaft and spaced from the shaft, said arcuate member being integral with the rotatable member and having a peripheral lip slideably engaging the base for stabilizing the rotatable member, the shaft and the arcuate member defining a space therebetween, an arcuate resistance element mounted on the base concentric to the collector ring, and an equalizing contactor nestedly disposed in the space between the shaft and the arcuate member and constrained to rotate with the rotatable member, the contactor having a first contact button engaging the resistance element intermediate the ends thereof and a second contact button engaging the collector ring for electrically connecting the resistance element to the mounting bracket as the rotatable member is rotated.

2. In a variable resistance control, the combination of an electrically conductive mounting bracket having an aperture, a collector ring integrally secured to the mounting bracket and having a top surface, an electrically nonconductive apertured base supported by the mounting bracket, and having therein an aperture in axial alignment with the aperture in the mounting bracket, the area of the aperture in the base being greater than the area of the top surface of the collector ring so that the collector ring and mounting bracket can be assembled from one side of the base, the mounting bracket having a flat portion facing said one side of the base, the collector ring being disposed in axial alignment with the aperture of the base, an arcuate resistance element carried by the other side of the base in concentric relationship to the collector ring, an electrically nonconductive shaft rotatably supported in the aperture of the mounting bracket, an electrically nonconductive rotatable member integrally secured to the shaft in spaced relationship to the base, an electrically nonconductive means integrally secured to the rotatable member around the shaft for spacing the rotatable member from the base, and a contactor interposed between the rotatable member and the base and constrained to rotate with the member for wiping the collector ring and the resistance element intermediate the ends thereof.

3. In a variable resistance control, the combination of a mounting bracket having a flat center portion, a collector ring integral with and embossed from the flat center portion of the mounting bracket, an electrically nonconductive base provided with an aperture, the flat central portion of the mounting bracket having a portion thereof extending around the aperture in the base and engaging one side of the base, the collector ring projecting from the portion of the bracket engaging one side of the base into the aperture in the base at least the thickness of the base, an arcuate resistance element carried by the other side of the base in spaced concentric relationship to the collector ring, a rotatable member provided with an arcuate cavity opening toward the collector ring, said bracket being provided with an aperture, a heat-deformable shaft received in the aperture in the bracket connecting the rotatable member to the mounting bracket, and an equalizing contactor nested in the arcuate cavity and constrained to rotate with the rotatable member, the equalizing contactor having a first contact button engaging the resistance element intermediate the ends thereof and a second contact button engaging the collector ring for electrically connecting the resistance element to the mounting bracket as the rotatable member is rotated.

4. A variable resistance control comprising a mounting bracket, an apertured collector ring integral with the mounting bracket and embossed from the center portion of the mounting bracket, an electrically nonconductive base supported by the mounting bracket, the collector ring projecting into an opening provided in the base, a resistance element carried by the base in spaced relationship to the collector ring, a rotatable member, an electrically nonconductive shaft of heat-deformable material connected to the rotatable member and rotatably journaled in the aperture of the collector ring, the portion of the shaft extending beyond the aperture being enlarged and rotatably securing the shaft to the mounting bracket, the portion of the shaft in the aperture being enlarged to improve the fit of the shaft in the aperture, and a contactor carried by the rotatable member for wiping the collector ring and the resistance element intermediate the ends thereof.

5. A variable resistance control comprising a mounting bracket, an electrically nonconductive base supported by the mounting bracket, a resistance element carried by the base, a rotatable member, an electrically nonconductive shaft of heat-deformable material connected to the rotatable member and rotatably journaled in an aperture provided in the mounting bracket, the portion of the shaft extending beyond the aperture being enlarged and rotatably securing the shaft to the mounting bracket, the portion of the shaft in the aperture being of a slightly larger diameter than the portion of the shaft connected to the rotatable member to improve the fit of the shaft in the aperture, a collector ring carried by the base, and a contactor carried by the rotatable member for wiping the collector ring and the resistance element intermediate the ends thereof.

6. A variable resistance control comprising an apertured base, a resistance element carried by the base, a collector ring carried by the base, a rotatable member, an electrically nonconductive shaft of heat-deformable material connected to the rotatable member and rotatably journaled in an aperture provided in the base, the portion of the shaft extending beyond the aperture being enlarged and rotatably securing the shaft to the base, the portion of the shaft in the aperture being of a slightly larger diameter than the portion of the shaft connected to the rotatable member to improve the fit of the shaft in the aperture, and a contactor carried by the rotatable member for wiping the collector ring and the resistance element intermediate the ends thereof.

7. A variable resistance control comprising a mounting bracket, a collector ring integral with the mounting bracket and projecting from the center portion thereof, an electrically nonconductive base supported by the mounting bracket, the base being provided with an opening receiving the collector ring, means for preventing relative rotation between the mounting bracket and the electrically nonconductive base, a resistance element mounted on the base in concentric relationship to the collector ring, a rotatable member, a shaft of heat-deformable material integral with the rotatable member, the end portion of the shaft being journaled in an aperture provided in the collector ring, the end portion of the shaft extending beyond the aperture being enlarged to connect the shaft to the mounting bracket, the rotatable member being provided with an arcuate cavity opening toward the collector ring, an equalizing contactor nested in the arcuate cavity and constrained to rotate with the rotatable member, the equalizing contactor having a pair of opposite ends and a pair of arms integral with the contactor and extending outwardly thereof for pivotally supporting the opposite ends of the contactor, the one end of the contactor having a first contact button engaging the resistance element intermediate the ends thereof and the other end of the contactor having a second contact button engaging the collector ring for electrically connecting the resistance element to the mounting bracket as the rotatable member is rotated.

8. A variable resistance control comprising a combination mounting bracket and collector ring, the collector ring being embossed from the center portion of the mounting bracket, an electrically nonconductive base supported by the combination mounting bracket and collector ring, the collector ring being disposed in an aperture provided in the electrically nonconductive base and projecting inwardly of the base, an arcuate resistance element mounted on the base in concentric relationship to the collector ring, an electrically nonconductive heat-deformable rotatable member, means securing the rotatable member to the combination mounting bracket and collector ring, and an equalizing contactor carried by the rotatable member and constrained to rotate therewith, the contactor comprising a pair of outwardly extending preformed arms, each arm having a pivotal edge engaging the inner surface of the rotatable member, the contactor having a first contact button engaging the resistance element intermediate the ends thereof and a second contact button engaging the collector ring for electrically connecting the resistance element to the combination mounting bracket and the collector ring as the rotatable member is rotated, the contactor being adapted to pivot on the pivotal edges for equalizing the contact pressures in a preset ratio against the resistance element and the collector ring as the contactor is constrained to rotate with the rotatable member.

9. In a variable resistance control, the combination of a mounting bracket having a flat portion, a collector ring integral with the flat portion of the mounting bracket, an electrically nonconductive base provided with an aperture, the flat portion of the mounting bracket engaging one side of the base and the collector ring projecting into the aperture at least the thickness of the base, an arcuate resistance element carried by the other side of the base in spaced concentric relationship to the collector ring, a rotatable member provided with an arcuate cavity opening toward the collector ring, a shaft connecting the rotatable member to the mounting bracket, the end portion of the shaft being disposed in an aperture of the collector ring, the end portion of the shaft extending beyond the aperture of the collector ring being enlarged to maintain the shaft assembled to the mounting bracket, the portion of the shaft in the aperture of the collector ring being enlarged to decrease the tolerance between the shaft and the bearing, and a contactor nested in the arcuate cavity and constrained to rotate with the rotatable member, the contactor having a first contact button engaging the resistance element intermediate the ends thereof and a second contact button engaging the collector ring for electrically connecting the resistance element to the mounting bracket as the rotatable member is rotated.

10. In a variable resistance control, the combination of an electrically conductive mounting bracket, a snap-in finger integral with the mounting bracket for positioning the control at a definite distance from a panel, said snap-in finger being provided with a lateral abutment adapted to seat upon a panel, said snap-in finger being adapted for detent-like engagement in a hole provided in the panel upon which the abutment seats, a collector of a predetermined size integral with the mounting bracket, said collector having a top surface and provided with a bearing, an electrically nonconductive base carried by the mounting bracket and having one side of the base facing the mounting bracket, one side of the base facing the mounting bracket, the nonconductive base having an aperture therein, the area of the aperture in the base being greater than the area of the top surface of the collector so that the collector and mounting bracket can be assembled to the base from one side of the base, an arcuate resistance element secured on the other side of the base circumposing the collector, a contactor engaging the resistance element and the collector for electrically connecting the resistance element to the mounting bracket, and rotatable means supported in the bearing, said contactor being constrained to rotate with said means for wiping the element intermediate the ends thereof.

References Cited

UNITED STATES PATENTS

| | | | |
|---|---|---|---|
| 2,829,224 | 4/1958 | De Bell | 338—163 |
| 3,032,734 | 5/1962 | Zunker et al. | 338—163 |
| 1,192,360 | 7/1916 | Wiegand | 338—193 X |
| 2,717,944 | 9/1955 | Daily | 338—174 X |
| 2,946,032 | 7/1960 | Daily | 338—174 |
| 3,129,400 | 4/1964 | Hartman | 338—162 |

FOREIGN PATENTS 614,983 1/1961 Italy.

RICHARD M. WOOD, *Primary Examiner.*

J. G. SMITH, *Assistant Examiner.*

UNITED STATES PATENT OFFICE
CERTIFICATE OF CORRECTION

Patent No. 3,375,478                                 March 26, 1968
John Van Benthuysen et al.

It is certified that error appears in the above identified patent and that said Letters Patent are hereby corrected as shown below:

Column 1, line 37, strike out "at", first occurrence; column 4, line 45, after "14b" strike out the comma; column 6, line 50, strike out "apertured"; column 9, lines 10 and 11, strike out "one side of the base facing the mounting bracket,".

Signed and sealed this 29th day of July 1969.

(SEAL)
Attest:

Edward M. Fletcher, Jr.                         WILLIAM E. SCHUYLER, JR.
Attesting Officer                                Commissioner of Patents